(12) United States Patent
McAuliffe et al.

(10) Patent No.: US 10,088,056 B2
(45) Date of Patent: Oct. 2, 2018

(54) BUTTERFLY VALVE WITH MODIFIED SCOTCH YOKE CONNECTION

(71) Applicant: Hamilton Sundstrand Corporation, Windsor Locks, CT (US)

(72) Inventors: Christopher McAuliffe, Windsor, CT (US); Joshua Kamp, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/605,271

(22) Filed: Jan. 26, 2015

(65) Prior Publication Data
US 2016/0215889 A1    Jul. 28, 2016

(51) Int. Cl.
*F16K 31/12* (2006.01)
*F16K 31/14* (2006.01)
(Continued)

(52) U.S. Cl.
CPC .............. *F16K 1/22* (2013.01); *F15B 15/066* (2013.01); *F16K 1/221* (2013.01); *F16K 31/047* (2013.01);
(Continued)

(58) Field of Classification Search
CPC .............. F16K 31/122; F16K 31/1225; F16K 31/1223; F16K 31/1635; F16K 31/1655; F16K 31/143
(Continued)

(56) References Cited

U.S. PATENT DOCUMENTS 2,928,375 A * 3/1960 Herrmann .............. B65G 27/00
  198/766
3,260,496 A * 7/1966 Borcherdt ............. F16K 1/2263
  251/171
(Continued)

FOREIGN PATENT DOCUMENTS

DE    1947865       9/1969
FR    2933760 A1    1/2010
(Continued)

OTHER PUBLICATIONS

Extended European Search Report, for European Patent Application No. 16152779.1, dated Jun. 10, 2016, 8 pages.
(Continued)

*Primary Examiner* — Reinaldo Sanchez-Medina
*Assistant Examiner* — Hailey K Do
(74) *Attorney, Agent, or Firm* — Kinney & Lange, P.A.

(57) ABSTRACT

An embodiment of a valve includes a housing having at least an actuator chamber above a main fluid passage. A flow control member is mounted to a first longitudinal end of the valve shaft extending into, and is rotatable in, the main fluid passage. The linear actuator is retained in the actuator chamber, and includes a piston rod connected to at least one piston, and a slot formed transverse to a length of the piston rod. A yoke assembly includes a crank connected proximate to the second end of the valve shaft, A bearing assembly connecting the valve shaft and the piston rod includes at least one bearing connected to the crank such that the yoke assembly is adapted to translate linear motion of the piston shaft to rotational motion of the valve shaft, and vice versa.

15 Claims, 6 Drawing Sheets

(51) Int. Cl.
*F16K 31/16* (2006.01)
*F16K 1/22* (2006.01)
*F16K 31/122* (2006.01)
*F16K 31/143* (2006.01)
*F16K 31/163* (2006.01)
*F15B 15/06* (2006.01)
*F16K 31/04* (2006.01)

(52) U.S. Cl.
CPC ........ *F16K 31/1225* (2013.01); *F16K 31/143* (2013.01); *F16K 31/1635* (2013.01); *F16K 31/122* (2013.01)

(58) Field of Classification Search
USPC .................. 251/62, 63, 304, 308, 315.61
See application file for complete search history.

(56) References Cited

U.S. PATENT DOCUMENTS

| | | | |
|---|---|---|---|
| 3,480,254 A * | 11/1969 | Fawkes | F16K 1/22 251/305 |
| 3,591,127 A * | 7/1971 | Luger | F16K 31/1635 251/161 |
| 3,704,986 A * | 12/1972 | Sheesley | F15B 15/066 74/104 |
| 3,753,386 A | 8/1973 | Scott, Jr. | |
| RE29,253 E | 6/1977 | Daghe et al. | |
| 4,075,898 A | 2/1978 | Carlson, Jr. | |
| 4,533,113 A * | 8/1985 | Francart, Jr. | F16K 5/0242 137/595 |
| 4,765,589 A * | 8/1988 | Sauze | F16K 1/221 251/229 |
| 5,000,077 A * | 3/1991 | Habicht | F15B 15/066 74/104 |
| 5,924,671 A * | 7/1999 | Baumann | F15B 15/066 251/285 |
| 6,514,044 B2 | 2/2003 | Talasco et al. | |
| 6,775,990 B2 | 8/2004 | Swinford | |
| 6,957,800 B2 | 10/2005 | Wingett et al. | |
| 7,025,088 B2 | 4/2006 | Saunders | |
| 7,296,969 B2 | 11/2007 | Raes et al. | |
| 7,537,022 B2 | 5/2009 | LaBenz et al. | |
| 7,731,152 B2 | 6/2010 | Abel et al. | |
| 8,613,198 B2 | 12/2013 | Swinford | |
| 2004/0129906 A1 * | 7/2004 | Authelet | F16K 27/08 251/12 |
| 2012/0318216 A1 * | 12/2012 | Kudo | F01L 1/18 123/90.5 |
| 2013/0248747 A1 | 9/2013 | Marocchini et al. | |

FOREIGN PATENT DOCUMENTS

JP    S58113681 A    7/1983
WO   2005066474 A1   7/2005

OTHER PUBLICATIONS

EP Office Action for European Patent Application No. 16152779.1, dated Nov. 29, 2017, 6 pages.

* cited by examiner

BUTTERFLY VALVE WITH MODIFIED SCOTCH YOKE CONNECTION

BACKGROUND

The present disclosure is directed generally to butterfly valves, and more specifically, to actuation of butterfly valves.

Pneumatically actuated butterfly valves require a means for translating the pistons axial motion into rotary motion to rotate the valve disc from open to closed. Typically a link—with bearings at each end—provides the connection between the piston and the crank arm which rotates the shaft for the butterfly disc. Often there are wear issues associated with the bearings at either end of the crank. Also, in high vibration environments like engine bleed systems, a piston torsional mode may be excited which leads to excessive piston ring wear. In such arrangements, the piston has the rotational inertia and the link provides the torsional stiffness.

SUMMARY

An embodiment of a valve includes a valve housing, a valve shaft, a flow control member, a linear actuator, and a yoke assembly. The housing includes first walls defining at least a main fluid passage, and second walls defining an actuator chamber above the main fluid passage, with the valve shaft extending along a shaft passage connecting the actuator chamber and the main fluid passage. The flow control member is mounted to a first longitudinal end of the valve shaft extending into, and is rotatable in, the main fluid passage. The linear actuator is retained in the actuator chamber, and inclues at least one piston, a piston rod connected to the at least one piston, and a slot formed in the piston rod transverse to a length of the piston rod. The yoke assembly includes a crank connected proximate to the second end of the valve shaft, and a bearing assembly connecting the valve shaft and the piston rod. The bearing assembly includes at least one bearing connected to the crank such that the yoke assembly is adapted to translate linear motion of the piston shaft to rotational motion of the valve shaft, and vice versa.

An embodiment of a valve actuator assembly includes a linear actuator and a yoke assembly. The linear actuator includes at least one piston, a piston rod connected to the at least one piston, and a slot formed in the piston rod transverse to a length of the piston rod. The yoke assembly includes a crank connected proximate to the second end of the valve shaft, and a bearing assembly for connecting the valve shaft and the piston rod. The bearing assembly includes at least one bearing connected to the crank such that the yoke assembly is adapted to translate linear motion of the piston rod to rotational motion of the valve shaft, and vice versa.

DETAILED DESCRIPTION

Figure 1:
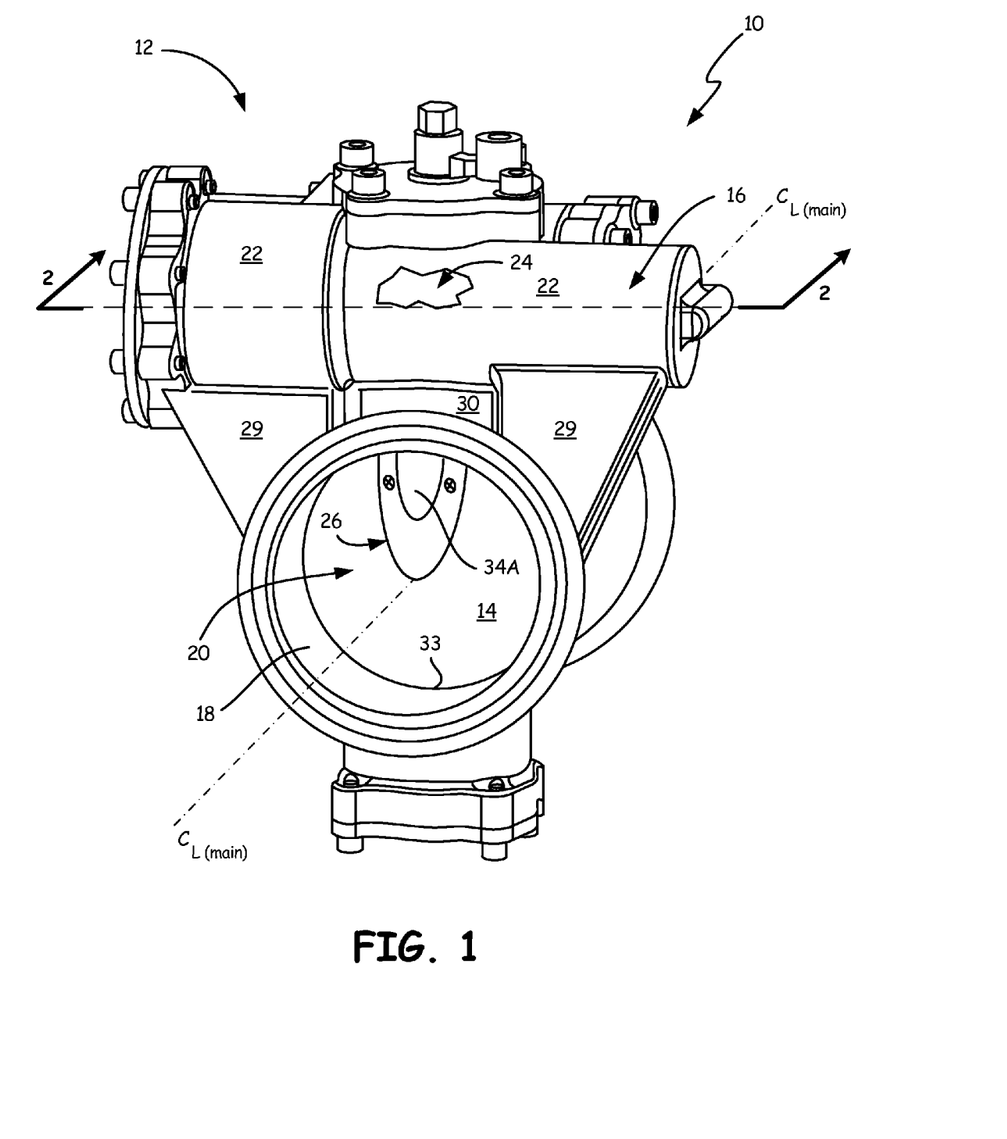
FIG. 1 is a perspective view of a butterfly valve.
Figure 2:
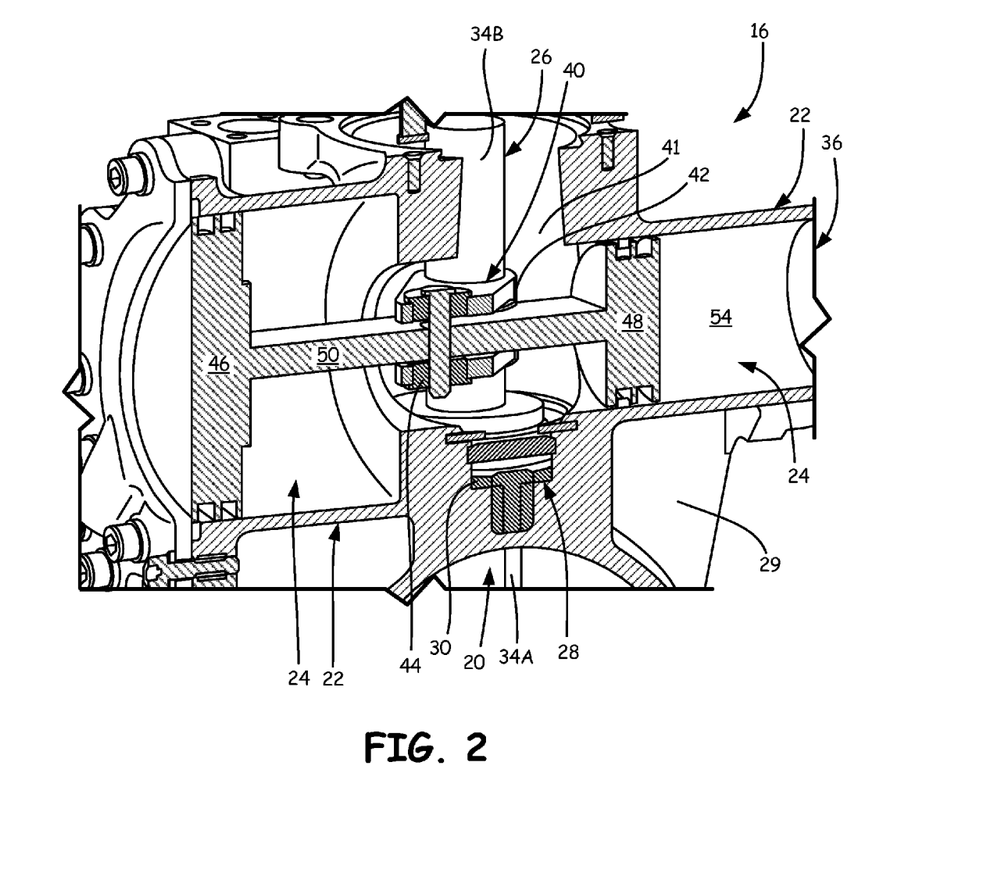
FIG. 2 is a perspective sectional view of a butterfly valve with a first example embodiment of an actuator assembly.

FIG. 1 is a perspective view of valve 10, and FIG. 2 is a sectional view taken through line 2-2 of FIG. 1. Valve 10 generally includes valve housing 12, flow control member 14, and actuator assembly 16. Valve housing 12 can include several walls to define various passages and chambers for the operable elements of valve 10. In this non-limiting illustrative example, housing 12 includes at least one first wall 18 defining main fluid passage 20, as well as one or more second walls 22 defining actuator chamber 24 (best seen in FIG. 2).

Shaft 26 extends through shaft passage 28, which in this instance can be formed through at least one housing wall (e.g., wall 30). As best illustrated in FIG. 2, shaft 26 can be inserted through an opening in wall 30 which separate main fluid passage 20 and actuator chamber 24. The opening defines a portion of shaft passage 28. Depending on the particular construction of valve 10, wall 30 can include one or both of a first wall 18 and a second wall 22. Wall 30 may also be a common wall bounding portions of both main fluid passage 20 and actuator chamber 24.

Line 2-2 is taken through actuator chamber 24 to show details of a first example embodiment of an actuator assembly in FIG. 2. As seen in FIGS. 1-2, support brackets 29 can connect at least one first wall 18 to at least one of the plurality of second walls 22. These support brackets 29, which can be integral to housing 12, can be helpful when actuator chamber 24 and actuator unit(s) 36 are supported transversely above main fluid passage 20.

Flow control member 14 can be adapted to rotate in main fluid passage 20 via rotation of shaft 26. Though shown in a closed position, rotational position of flow control member 14 results in an opening for fluid to pass through main fluid passage 20. In the illustrative example of a butterfly valve, rotational position of flow control member 14 defines the size of a fluid opening about perimeter 33 of flow control member 14. The rotational position and speed of flow control member 14 (via shaft 26) can be calibrated in conjunction with actuator assembly 16 to control an effective size of the flow opening.

Flow control member 14 (e.g., a butterfly disc) can be mounted to a first longitudinal end 34A of shaft 26, and which extends into main fluid passage 24, while second longitudinal end 34B of shaft 26 is connected to actuator assembly 16. Flow control member 14/butterfly disc 14 can be canted relative to a length of shaft 26 to facilitate rotation and reducing the moment arm required to keep the valve closed against fluid forces in main fluid passage 20.

To drive rotation of shaft 26 (and flow control member 14), actuator assembly 16 can include at least one actuator unit 36 adapted to effect rotation of flow control member 14 via shaft second longitudinal end 34B. In this way, rotation of flow control member 14 can control fluid flow through main fluid passage 20.

In a transverse arrangement, actuator assembly 16 can include one or more linear actuator units 36 disposed in actuator chamber 24, so that both have longitudinal axes disposed transverse to valve centerline $C_L$(main). In this example illustrative embodiment, valve centerline $C_L$(main) can be defined parallel to longitudinal axis 32 of main fluid passage 20 so that actuator unit(s) 36 are arranged perpendicular to the flow direction through passage 20. This is described in more detail with reference to commonly assigned U.S. patent application entitled "VIBRATION TOLERANT BUTTERFLY VALVE", Ser. No. 14/599,898 filed on Jan. 19, 2015. However, it will be appreciated by those skilled in the art that certain embodiments of the presently disclosed subject matter does not require a housing or actuator configuration as is described in the incorporated application.

FIG. 2 also shows a mechanical connection between shaft 26 and actuator unit 36. Yoke assembly 40, disposed in intermediate chamber 41, can include crank 42 secured or otherwise connected to shaft 26, as well as at least one bearing assembly 44 providing an additional degree of (rotational) freedom. This allows a pin or other connector to rotate freely relative to crank 42 while allowing force translation between actuator unit 36 and valve shaft 26. More details of this example embodiment of yoke assembly 40 are shown in subsequent figures.

As seen in more detail below, yoke assembly 40, disposed in intermediate portion 41 of actuator chamber 24, can include crank 42 connected proximate to valve shaft second end 34B. Bearing assembly 44 connects valve shaft 26 and actuator unit 36, and can include at least one bearing connected to crank 42 such that yoke assembly 40 is adapted to translate linear motion of actuator unit(s) 36 to rotational motion of valve shaft 26, and vice versa.

Figure 3A:
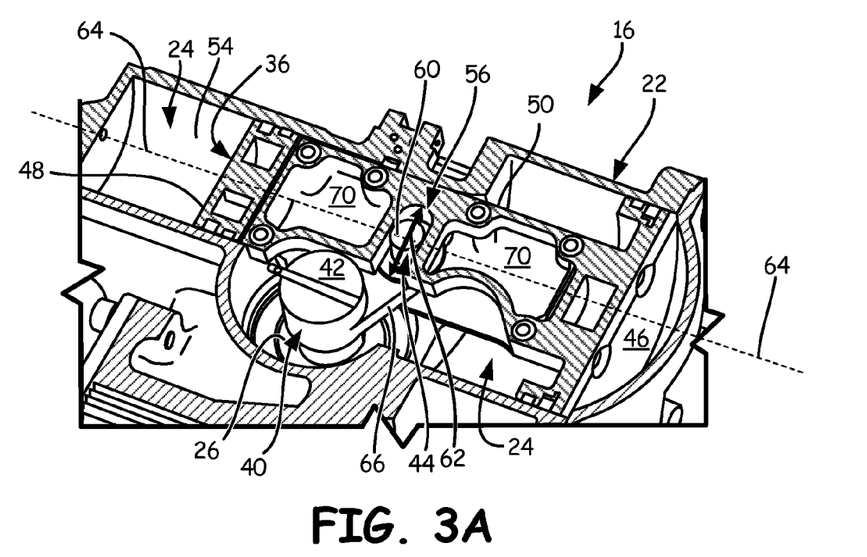
FIG. 3A is a top sectional view of the first example actuator assembly in a first configuration.
Figure 3B:
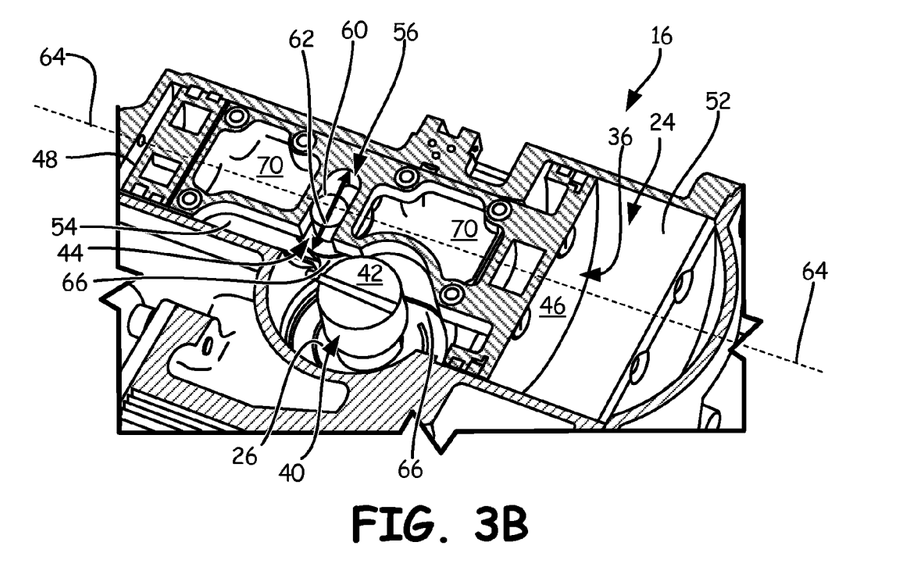
FIG. 3B is a top sectional view of the first example actuator assembly in a second configuration.

Linear actuator unit 36 can be retained in actuator chamber 24 and can include at least one piston. Here, actuator unit 36 has a pair of longitudinally opposed pistons, servo piston 46 and supply piston 48, with piston rod 50 connected therebetween. Rod 50 is shown solid but can be weight-reduced as shown in FIGS. 3A and 3B. Each piston 46, 48 is disposed in corresponding servo portion 52 and supply portion 54 of actuator chamber 24. Each piston 46, 48 can have a different active surface area so as to tailor opening and closing forces. Actuation force, such as closing force, can be provided or supplemented by a torque motor (not shown).

FIG. 3A shows linear actuator unit 36 and yoke assembly 40 in a first configuration, while FIG. 3B shows linear actuator unit 36 and yoke assembly 40 in a second configuration. For illustrative purposes, the first configuration in FIG. 3A will assume flow control member 14 (shown in FIG. 1) to be in an open position, while the second configuration in FIG. 3B assumes flow control member 14 in a closed position.

Slot 56 can be formed approximately midway along piston rod 50 between servo piston 46 and supply piston 48. Slot 56 can be formed transverse to a length of piston rod 50 to attach yoke assembly 40, so that in certain embodiments, a length of slot 56 as well as travel axis 62 for pin 60 are also transverse to the direction of piston travel. Pin 60 travels along slot 56 with its linear (transverse) position dependent on where pistons 46, 48 are situated along axis 64.

A bearing assembly 44 (which can include a roller bearing and/or pin as shown in FIGS. 3A and 3B) includes a portion that rides in slot 56 which is longitudinally located transverse to the direction of piston travel (e.g., along axis 64). This configuration can be called a modified scotch yoke. A conventional scotch yoke generally has a pin which slides along a slot to effect translation of linear motion from one body into rotational motion of another body (or vice versa). Conventionally, the pin is not free to rotate relative to its longitudinal axis, and thus when engaged in the slot, the pin will be pushed side to side, rather than roll. In a conventional scotch yoke, frictional wear could more easily occur along the surface of the pin and along the slot edge surfaces. It can also result in unwanted side loads along the piston rings. Both of these can result in a need for frequent maintenance and repair.

This arrangement in the illustrative embodiment, and arrangements like it, also eliminate a linkage arm of conventional butterfly valve actuators used to connect a piston to a disc/shaft crank arm. In this example, pin 60 has an additional degree of freedom in that it is freely rotatable relative to arm 66 of crank 42. This can be due to bearing assembly 44 having one or more roller element bearings located in crank arm 66 (shown in more detail in FIG. 4).

FIGS. 3A and 3B also show other optional modifications which can improve performance under various conditions. For one, in certain embodiments, slot 56 is open on one side of piston rod 50. Here, slot 56 is open on a side of piston rod 50 nearest to valve shaft 26. This can be done to reduce the size of pistons 46, 48 while providing clearance for piston rod 50 to move back and forth past crank 42 (and the rest of valve shaft 26). This allows for a lighter, more compact actuator. To further reduce weight, portions of piston rod 50 can optionally be hollowed out defining one or more cavities 70.

Figure 4:
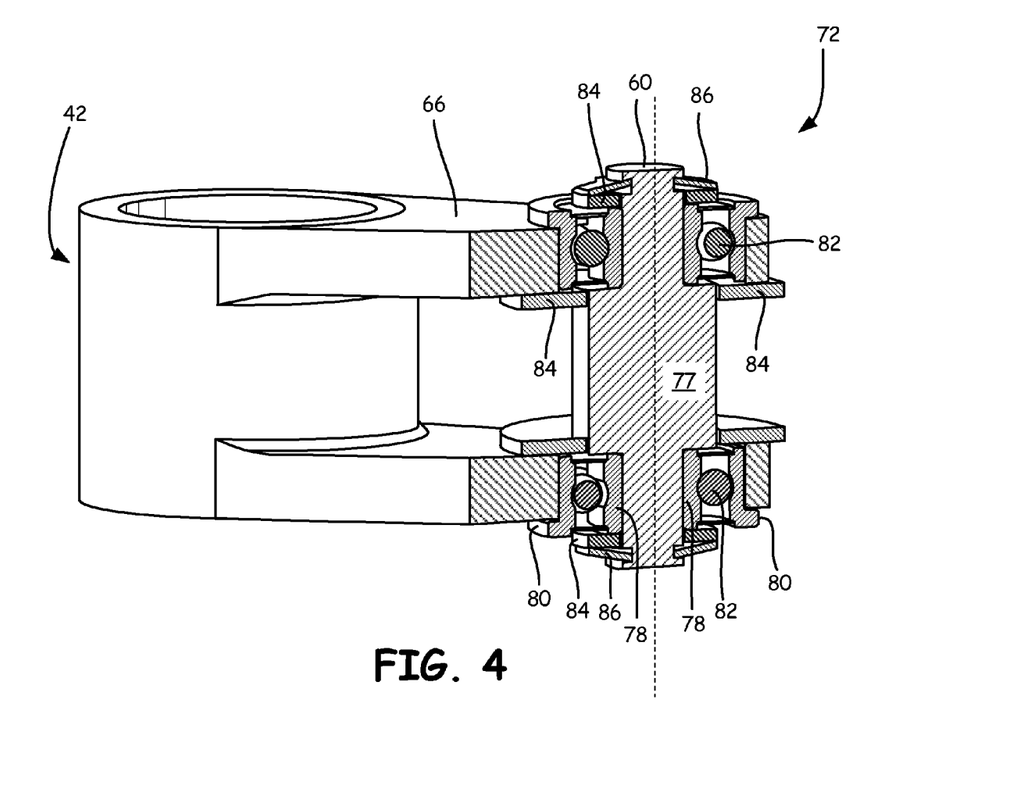
FIG. 4 shows a crank and bearing assembly.

FIG. 4 shows a connection of a roller bearing assembly 72 to arm 66 of crank 42. In FIG. 4, a section is taken through the end of crank arm 66 and roller bearing assembly 72. In this example, crank 42 has arm 66 with roller pin 60 retained therein. Upper pin portion 74 and lower pin portion 76 are narrowed relative to pin body 77. Inner bearing races 80 are disposed about upper and lower pin portions 74, 76, while outer bearing races 82 are disposed about crank arms 66. Roller bearing elements 82 are disposed between inner and outer races 78, 80, with everything held in place by spacer(s) 84 and clip(s) 86.

With roller bearing assembly 72, pin 60 is free to rotate about axis 88, and can roll along edge surfaces of slot 56 (shown in FIGS. 3A and 3B) instead of sliding therealong. The ability for pin 60 to roll along edges of slot 56 and rotate about axis 80 greatly reduces wear and resultant performance degradation associated with a sliding pin. A roller bearing assembly such as assembly 72 is robust and can provide suitable force translation as part of yoke assembly 40 in a variety of high pressure applications.

Figure 5:
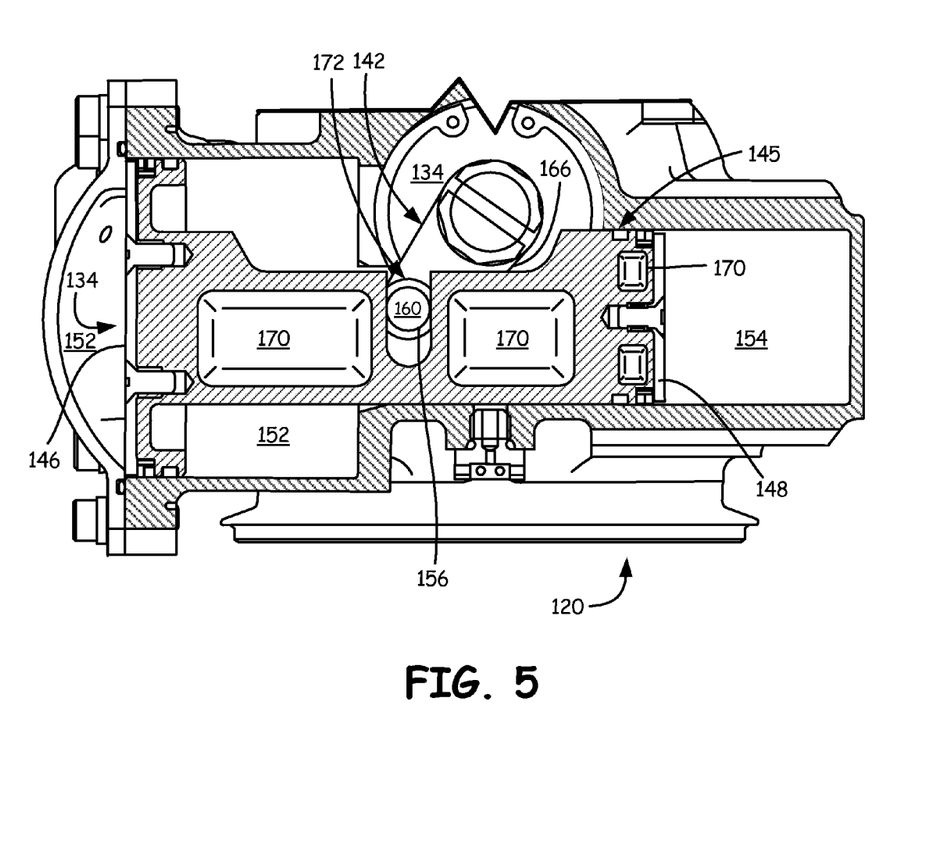
FIG. 5 is a sectional view of a second example actuator embodiment.

FIG. 5 shows an alternative actuator assembly 116 in actuator chamber 124. Yoke assembly 140 also has crank 142 with arm(s) 166 supporting needle bearing assembly 172. Pin 160 can engage a slot (e.g., slot 156) running transverse to a direction of travel of pistons 146, 148 through servo and supply chambers 152, 154 so as to similarly translate linear motion of actuator unit 136 to rotational motion of a shaft (e.g., shaft 134), and vice versa.

Needle bearing 172 also provides an additional degree of freedom in that pin 160 also is made freely rotatable relative to arm(s) 166 of crank 142. Like the first example embodiment, needle bearing assembly 172 also eliminates the linkage arm of conventional butterfly valve actuators used to connect the piston to the disc/shaft crank arm.

Figure 6:
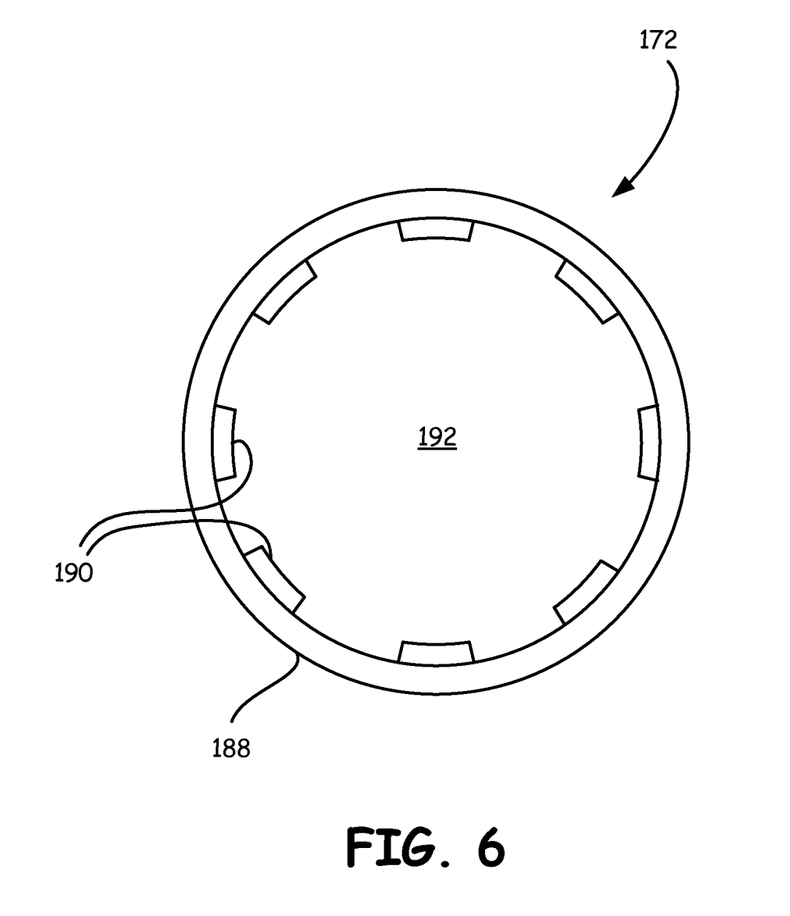
FIG. 6 is a needle bearing for the embodiment shown in FIG. 5.

FIG. 6 shows a cutaway of a needle bearing assembly, 172, which can include cup 188 with a plurality of elongated "needles" 190 arranged circumferentially about an interior 192. Needles 190 can be partially recessed and secured in a rotatable manner to interior wall 192. A pin 160 (shown in FIG. 5) can be supported by these needles 190, facilitating translation of linear motion to rotational motion and vice versa as described previously.

Discussion of Possible Embodiments

The following are non-exclusive descriptions of possible embodiments of the present disclosure.

An embodiment of a valve includes a housing, a valve shaft, a flow control member, a linear actuator, and a yoke assembly. The housing includes first walls defining at least a main fluid passage, and second walls defining an actuator chamber above the main fluid passage, with the valve shaft extending along a shaft passage connecting the actuator chamber and the main fluid passage. The flow control member is mounted to a first longitudinal end of the valve shaft extending into, and is rotatable in, the main fluid passage. The linear actuator is retained in the actuator chamber, and inclues at least one piston, a piston rod connected to the at least one piston, and a slot formed in the piston rod transverse to a length of the piston rod. The yoke assembly includes a crank connected proximate to the second end of the valve shaft, and a bearing assembly connecting the valve shaft and the piston rod. The bearing assembly includes at least one bearing connected to the crank such that the yoke assembly is adapted to translate linear motion of the piston shaft to rotational motion of the valve shaft, and vice versa.

The valve of the preceding paragraph can optionally include, additionally and/or alternatively, any one or more of the following features, configurations and/or components:

A valve for a gas turbine engine according to an exemplary embodiment of this disclosure, among other possible things includes: a valve housing including one or more first walls defining at least a main fluid passage, and one or more second walls defining an actuator chamber above the main fluid passage; a valve shaft extending along a shaft passage connecting the actuator chamber and the main fluid passage; a flow control member mounted to a first longitudinal end of the valve shaft extending into the main fluid passage, the flow control member rotatable in the main fluid passage; a linear actuator retained in the actuator chamber, the linear actuator including at least one piston, a piston rod connected to the at least one piston, and a slot formed in the piston rod transverse to a length of the piston rod; and a yoke assembly including a crank connected proximate to the second end of the valve shaft, and a bearing assembly connecting the valve shaft and the piston rod, the bearing assembly including at least one bearing connected to the crank such that the yoke assembly is adapted to translate linear motion of the piston shaft to rotational motion of the valve shaft, and vice versa.

A further embodiment of the foregoing valve, wherein the flow control member includes a butterfly disc.

A further embodiment of any of the foregoing valves, wherein the disc is canted relative to a length of the valve shaft.

A further embodiment of any of the foregoing valves, wherein the linear actuator includes a pair of longitudinally opposed pistons linked by the piston rod.

A further embodiment of any of the foregoing valves, wherein the pair of pistons includes a supply piston and a servo piston, each piston having a different active surface area.

A further embodiment of any of the foregoing valves, wherein the bearing assembly includes a roller bearing.

A further embodiment of any of the foregoing valves, wherein the bearing assembly includes a needle bearing.

A further embodiment of any of the foregoing valves, wherein the piston rod includes at least one cavity between the at least one piston and the valve shaft.

A further embodiment of any of the foregoing valves, wherein the slot is open on a side of the piston rod nearest to the valve shaft.

An embodiment of a valve actuator assembly includes a linear actuator and a yoke assembly. The linear actuator includes at least one piston, a piston rod connected to the at least one piston, and a slot formed in the piston rod transverse to a length of the piston rod. The yoke assembly includes a crank connected proximate to the second end of the valve shaft, and a bearing assembly for connecting the valve shaft and the piston rod. The bearing assembly includes at least one bearing connected to the crank such that the yoke assembly is adapted to translate linear motion of the piston rod to rotational motion of the valve shaft, and vice versa.

The valve actuator assembly of the preceding paragraph can optionally include, additionally and/or alternatively, any one or more of the following features, configurations and/or additional components: a linear actuator including at least one piston, a piston rod connected to the at least one piston, and a slot formed in the piston rod transverse to a length of the piston rod; and a yoke assembly including a crank connected proximate to the second end of the valve shaft, and a bearing assembly for connecting the valve shaft and the piston rod, the bearing assembly including at least one bearing connected to the crank such that the yoke assembly is adapted to translate linear motion of the piston rod to rotational motion of the valve shaft, and vice versa.

A further embodiment of the foregoing valve actuator assembly, wherein the linear actuator includes a pair of longitudinally opposed pistons linked by the piston rod.

A further embodiment of any of the foregoing valve actuator assemblies, wherein the pair of pistons includes a supply piston and a servo piston, each piston having a different surface area.

A further embodiment of any of the foregoing valve actuator assemblies, wherein the bearing assembly includes a roller bearing.

A further embodiment of any of the foregoing valve actuator assemblies, wherein the bearing assembly includes a needle bearing.

A further embodiment of any of the foregoing valve actuator assemblies, wherein the slot is open on a side of the piston rod nearest to the valve shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve comprising:
   a valve housing including one or more first walls defining at least a main fluid passage, and one or more second walls defining an actuator chamber above the main fluid passage;
   a valve shaft extending along a shaft passage connecting the actuator chamber and the main fluid passage;
   a flow control member mounted to a first longitudinal end of the valve shaft extending into the main fluid passage, the flow control member rotatable in the main fluid passage;
   a linear actuator retained in the actuator chamber, the linear actuator including at least one piston, a piston rod connected to the at least one piston, a slot formed in the piston rod, the slot extending transversely to a length of the piston rod, and a groove disposed on a periphery of the piston rod intersecting with and extending transversally to a length of the slot; and a yoke assembly comprising:
- a crank connected proximate to a second end of the valve shaft, the crank including at least one crank arm extending from a first end toward a second end, the first end connected to the valve shaft transversely offset from the piston rod, the second end terminating above or below the slot formed in the piston rod; and
- a bearing assembly connecting the at least one crank arm and the piston rod, the bearing assembly including a pin supported by at least one bearing element connecting the at least one crank arm to an upper portion of the pin extending above the piston rod, or a lower portion of the pin extending below the piston rod, such that the upper portion or the lower portion of the pin is freely rotatable relative to the at least one crank arm, and such that a surface of a body of the pin, between the upper and lower portions, rolls in a direction transverse to the length of the piston rod along at least one edge of the slot as the yoke assembly translates linear motion of the piston shaft to rotational motion of the valve shaft, and vice versa.

2. The assembly of claim 1, wherein the at least one bearing element includes a roller bearing.

3. The assembly of claim 1, wherein the at least one bearing element includes a needle bearing.

4. The assembly of claim 1, wherein the piston rod includes at least one cavity between the at least one piston and the valve shaft.

5. The assembly of claim 1, wherein the slot is open on a side of the piston rod nearest to the valve shaft.

6. The assembly of claim 1, wherein the flow control member includes a butterfly disc.

7. The assembly of claim 6, wherein the butterfly disc is canted relative to a length of the valve shaft.

8. The assembly of claim 1, wherein the at least one piston includes a pair of longitudinally opposed pistons linked by the piston rod.

9. The assembly of claim 8, wherein the pair of longitudinally opposed pistons includes a supply piston and a servo piston, each piston having a different active surface area.

10. A valve actuator assembly comprising:
- a linear actuator including at least one piston, a piston rod connected to the at least one piston, a slot formed in the piston rod transversely to a length of the piston rod, and a groove disposed on a periphery of the piston rod intersecting with and extending transversally to a length of the slot; and
- a yoke assembly including a crank and a bearing assembly for connecting the piston rod to a valve shaft, the crank including at least one crank arm configured to extend from a first end toward a second end, the first end configured for connection to a valve shaft transversely offset from the piston rod, the second end terminating above or below the slot formed in the piston rod when connected to the transversely offset valve shaft, the bearing assembly including a pin supported by at least one bearing element connecting the at least one crank arm to an upper portion of the pin extending above the piston rod, or a lower portion of the pin extending below the piston rod, such that the upper portion or the lower portion of the pin is freely rotatable relative to the at least one crank arm, and such that a surface of a body of the pin, between the upper and lower portions, rolls in a direction transverse to the length of the piston rod along at least one edge of the slot as the yoke assembly translates linear motion of the piston rod to rotational motion of the valve shaft, and vice versa.

11. The assembly of claim 10, wherein the at least one bearing element includes a roller bearing.

12. The assembly of claim 10, wherein the at least one bearing element includes a needle bearing.

13. The assembly of claim 10, wherein the slot is open on a side of the piston rod nearest to the valve shaft.

14. The assembly of claim 10, wherein the at least one piston includes a pair of longitudinally opposed pistons linked by the piston rod.

15. The assembly of claim 14, wherein the pair of longitudinally opposed pistons includes a supply piston and a servo piston, each piston having a different surface area.

* * * * *